United States Patent
Cohen et al.

(10) Patent No.: US 11,044,520 B2
(45) Date of Patent: Jun. 22, 2021

(54) HANDLING OF VIDEO SEGMENTS IN A VIDEO STREAM

(71) Applicant: Telefonaktiebolaget LM Ericsson (publ), Stockholm (SE)

(72) Inventors: Sarel Cohen, Tel-Aviv (IL); Nir Drang, Givat Ada (IL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 16/473,424

(22) PCT Filed: Dec. 29, 2016

(86) PCT No.: PCT/EP2016/082847
§ 371 (c)(1),
(2) Date: Jun. 25, 2019

(87) PCT Pub. No.: WO2018/121865
PCT Pub. Date: Jul. 5, 2018

(65) Prior Publication Data
US 2020/0154165 A1 May 14, 2020

(51) Int. Cl.
*H04N 21/44* (2011.01)
*G06K 9/00* (2006.01)
(Continued)

(52) U.S. Cl.
CPC ... *H04N 21/44016* (2013.01); *G06K 9/00765* (2013.01); *H04N 21/812* (2013.01); *H04N 21/8456* (2013.01)

(58) Field of Classification Search
None
See application file for complete search history.

(56) References Cited

U.S. PATENT DOCUMENTS

| 9,510,044 B1 | 11/2016 | Pereira et al. |
| 2007/0124756 A1* | 5/2007 | Covell ............... H04N 21/8106 725/18 |
| 2014/0196085 A1 | 7/2014 | Dunker et al. |

FOREIGN PATENT DOCUMENTS

WO 2014178872 A2 11/2014

OTHER PUBLICATIONS

Author Unknown, "Digital Program Insertion Cueing Message for Cable," Society of Cable Telecommunications Engineers, Inc., American National Standard, ANSI/SCTE 35, 2016, 74 pages.
(Continued)

*Primary Examiner* — Nasser M Goodarzi
*Assistant Examiner* — Terrika Peterson
(74) *Attorney, Agent, or Firm* — Withrow & Terranova, PLLC

(57) ABSTRACT

There is provided mechanisms for determining a time offset for a video segment of a video stream using metadata. The metadata comprises time information of at least one of a start time and an end time of the video segment. A method is performed by a video network node. The method comprises extracting a first video part and a second video part from the video stream. Each of the first video part and the second video part comprises a common video segment. The method comprises identifying a sequence of video frames in the first video part that represents the common video segment. The method comprises determining the time offset based on a time difference between an end-point frame of the Identify sequence of video identified sequence of video frames and the time information in the metadata.

18 Claims, 11 Drawing Sheets

(51) Int. Cl.
      *H04N 21/81*     (2011.01)
      *H04N 21/845*   (2011.01)

(56) References Cited

OTHER PUBLICATIONS

Author Unknown, "Recommended Practice for SCTE 35 Digital Program Insertion Cueing Message for Cable," Society of Cable Telecommunications Engineers, Inc., American National Standard, ANSI/SCTE 67, 2014, 80 pages.

Covell, Michele et al., "Advertisement Detection and Replacement using Acoustic and Visual Repetition," 2006 IEEE Workshop on Multimedia Signal Processing, Victoria, BC, 2006, pp. 461-466.

Pham, Stefan et al., "Implementing Dynamic Ad Insertion in HTML5 Using MPEG DASH," International Broadcasting Conference (IBC), Sep. 2016, 13 pages.

International Search Report and Written Opinion for International Patent Application No. PCT/EP2016/082847, dated Oct. 6, 2017, 11 pages.

* cited by examiner

HANDLING OF VIDEO SEGMENTS IN A VIDEO STREAM

This application is a 35 U.S.C. § 371 national phase filing of International Application No. PCT/EP2016/082847, filed Dec. 29, 2016, the disclosure of which is incorporated herein by reference in its entirety.

TECHNICAL FIELD

Embodiments presented herein relate to a method, a video network node, a computer program, and a computer program product for determining a time offset for a video segment of a video stream using metadata.

BACKGROUND

Communications systems, for example implementing functionality of a content delivery network (CDN), can be used to serve content, such as video streams, to end-users with high availability and high performance. In some scenarios, additional content, such as advertisements, are inserted at one or more places in the video stream before it is delivered to the end-users.

In general terms, advertisement insertion concerns the insertion of new advertisement segments into video streams, and advertisement replacement concerns the replacement of existing advertisement segments in video streams with new advertisement segments. Advertisement segments are commonly grouped together into consecutive sequences of advertisements, each such sequence being denoted an "advertisement break". A television (TV) program may have a pre-roll advertisement break (comprising a sequence of advertisements before program start), any number of mid-roll advertisement breaks (each comprising a sequence of advertisements in the middle of the program), and a post-roll advertisement break (a sequence of advertisements after the end of the program). Pay TV operators usually sell advertisement slots for a certain time window. Two examples are called C3 and C7. For a C3 time window, for example, advertisements slots are sold for 3 days, and between the time the TV program was aired and until 3 days afterwards the advertisements must not be replaced. However, after the time period of 3 days, advertisement slots sold under the C3 contract may be replaced with new advertisements.

The act of inserting advertisements at the beginning and/or end of advertisement breaks, and/or replacing existing advertisements with new advertisements require accuracy in identifying the first and last frame of the advertisement break. Without this accuracy, advertisement insertion and advertisement replacement may result in a disruptive, choppy, or jagged appearance of the video stream to the viewer. To get a smooth advertisement insertion and advertisement replacement, the exact boundaries of the advertisement break within the video stream needs to be known.

TV operators have metadata regarding which advertisements where inserted to the video stream, at what start and end times each advertisement is found in the stream, and what is the duration of each advertisement. Such metadata can be stored in log files.

One mechanism for advertisement insertion and advertisement replacement could thus be to use the metadata as is, which describes approximately the start and end times of ad-breaks. However, it could be that the metadata of the log file is not well synchronized with the video stream, thus resulting in new advertisements being inserted in the middle of an existing advertisement, or replacing parts of TV programs and a prefix or a suffix of an existing advertisements with new advertisements instead of accurately replacing existing advertisements within an advertisement break with new advertisements.

Although advertisements have been mentioned as an example where a video segment (as defined by a single advertisement or an entire advertisement break) is to be replaced or removed from a video stream, there are also other examples where a video segment is to be replaced or removed from a video stream.

In view of the above, there is thus a need for an improved handling of video segments in a video stream.

SUMMARY

An object of embodiments of the invention herein is to provide mechanisms for accurately identifying a video segment in a video stream.

According to a first aspect of the invention there is presented a method for determining a time offset for a video segment of a video stream using metadata. The metadata comprises time information of at least one of a start time and an end time of the video segment. The method is performed by a video network node. The method comprises extracting a first video part and a second video part from the video stream. Each of the first video part and the second video part comprises a common video segment. The method comprises identifying a sequence of video frames in the first video part that represents the common video segment. The method comprises determining the time offset based on a time difference between an end-point frame of the identified sequence of video frames and the time information in the metadata.

According to a second aspect of the invention there is presented a video network node for determining a time offset for a video segment of a video stream using metadata. The metadata comprises time information of at least one of a start time and an end time of the video segment. The video network node comprises processing circuitry. The processing circuitry is configured to cause the video network node to extract a first video part and a second video part from the video stream. Each of the first video part and the second video part comprises a common video segment. The processing circuitry is configured to cause the video network node to identify a sequence of video frames in the first video part that represents the common video segment. The processing circuitry is configured to cause the video network node to determine the time offset based on a time difference between an end-point frame of the identified sequence of video frames and the time information in the metadata.

According to a third aspect of the invention there is a video network node for determining a time offset for a video segment of a video stream using metadata. The metadata comprises time information of at least one of a start time and an end time of the video segment. The video network node comprises processing circuitry and a storage medium. The storage medium stores instructions that, when executed by the processing circuitry, cause the video network node to perform operations, or steps. The operations, or steps, cause the video network node to extract a first video part and a second video part from the video stream. Each of the first video part and the second video part comprises a common video segment. The operations, or steps, cause the video network node to identify a sequence of video frames in the first video part that represents the common video segment. The operations, or steps, cause the video network node to determine the time offset based on a time difference between an end-point frame of the identified sequence of video frames and the time information in the metadata.

According to a fourth aspect of the invention there is presented a video network node for determining a time offset for a video segment of a video stream using metadata. The metadata comprises time information of at least one of a start time and an end time of the video segment. The video network node comprises an extract module configured to extract a first video part and a second video part from the video stream. Each of the first video part and the second video part comprises a common video segment. The video network node comprises an identify module configured to identify a sequence of video frames in the first video part that represents the common video segment. The video network node comprises a determine module configured to determine the time offset based on a time difference between an end-point frame of the identified sequence of video frames and the time information in the metadata.

According to a fifth aspect of the invention there is presented a computer program for determining a time offset for a video segment of a video stream using metadata, the computer program comprising computer program code which, when run on a video network node, causes the video network node to perform a method according to the first aspect.

According to a sixth aspect of the invention there is presented a computer program product comprising a computer program according to the fifth aspect and a computer readable storage medium on which the computer program is stored. The computer readable storage medium could be a non-transitory computer readable storage medium.

Advantageously the embodiments of the invention enable accurate identification of the video segment in the video stream. In turn, this enables efficient handling of video segments in the video stream.

Advantageously the embodiments of the invention provide an accurate identification of the first and last frames of the video segment.

Advantageously the embodiments of the invention need a comparatively small search window to accurately find the first and last frames of the video segment.

Advantageously the embodiments of the invention enable, with the use of the metadata, to identify the video segment even when the content of the video segment appears for the first time in the video stream.

Advantageously the embodiments of the invention enable accurate determination of the time offset in scenarios where the time offset is caused by transcoding, re-encoding, or other processing operations occurring before the video stream is played out at a client node.

Advantageously the embodiments of the invention enable efficient separation of the video segment from the video stream such that the video segment can be replaced or removed.

It is to be noted that any feature of the first, second, third, fourth, fifth and sixth aspects of the invention may be applied to any other aspect, wherever appropriate. Likewise, any advantage of the first aspect of the invention may equally apply to the second, third, fourth, fifth and/or sixth aspect of the invention, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
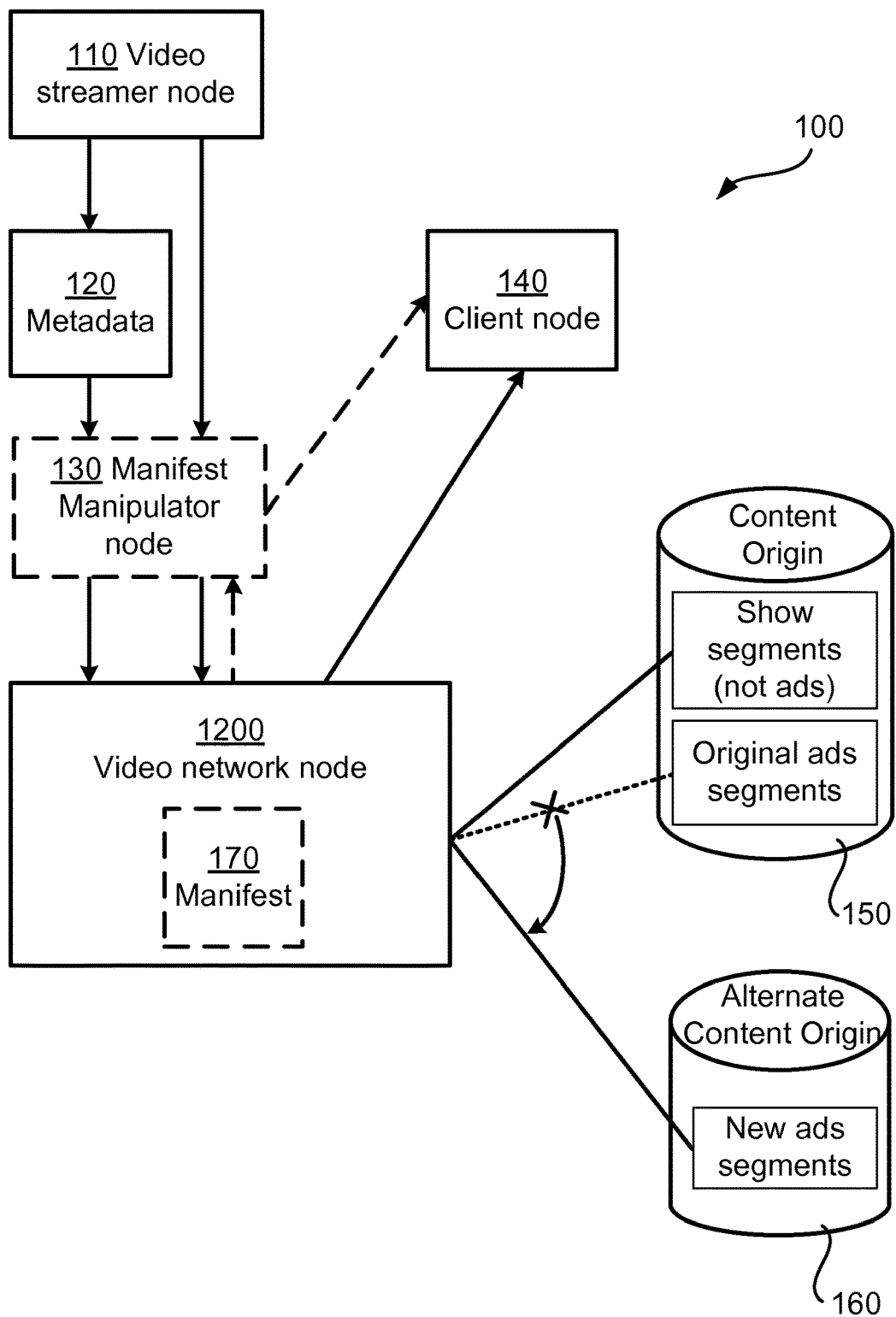
FIG. 1 is a schematic diagram illustrating a communications system according to embodiments of the invention.

FIG. 1 is a schematic diagram illustrating a communications system 100 where embodiments presented herein can be applied. The communications system 100 could implement the functionality of a content delivery network and comprises a video streamer node 110, a video network node 1200, a manipulator node 130 (optional), a client node 140, and content databases 150, 160 acting as video servers streaming and serving Uniform Resource Locators (URLs) of the video segments to the client node 140. The video streamer node 110 issues metadata 120 (for example provided in a log file) which specifies advertisement breaks within a video stream. The metadata 120 could describe a unique identity for every advertisement and the approximated start time and end times of each advertisement. In this respect the start time and end times of each advertisement as given by the metadata 120 could differ from only by a single video frame (corresponding to a duration in time of a fraction of a second) from the true start time and end times of each advertisement, to several video frames (corresponding to a duration in time of more than a second) from the true start time and end times of each advertisement. Further, the start time and end times of each advertisement could be indicated by the insertion of cue-tones in the video stream, which indicate the exact position of the ad-breaks. However, not all video streams have cue-tones inserted.

The client node 140 is configured to request a manifest 170 from the video network node 1200 upon playout of the video stream. In response to the request the video network node 1200 returns a manipulated manifest 170 which contains segments of the video stream from the original Content Origin database 150.

The video network node 1200 is configured to remove segments of old advertisements, and to insert segments of new advertisements with pointers, such as URLs, pointing to the Alternative Content Origin database 160 (instead of to the original advertisement segments in the Content Origin database 150). The decisions of where the advertisements are, that is, the decisions of which video segments to remove and where to insert the video segments of the new advertisements, are made based on the information supplied to the video network node 1200 by the metadata 120. For example, the metadata may be supplied by the operator in terms of starting times of the original advertisements when the video streamer node 110 inserts the advertisements into the video stream for the first time.

The video network node 1200 is configured, for example, to replace old advertisements within a recording of the video stream with new advertisements. The video network node 1200 relies on accurate metadata 120 describing where the existing advertisements are found.

The embodiments disclosed herein therefore relate to mechanisms for determining a time offset for a video segment of a video stream using metadata 120. The time offset results from the start time and end times of each advertisement as given by the metadata 120 not being accurate. In order to obtain such mechanisms there is provided a video network node 1200, a method performed by the video network node 1200, a computer program product comprising code, for example in the form of a computer program, that when run on a video network node 1200, causes the video network node 1200 to perform the method.

Figure 3:
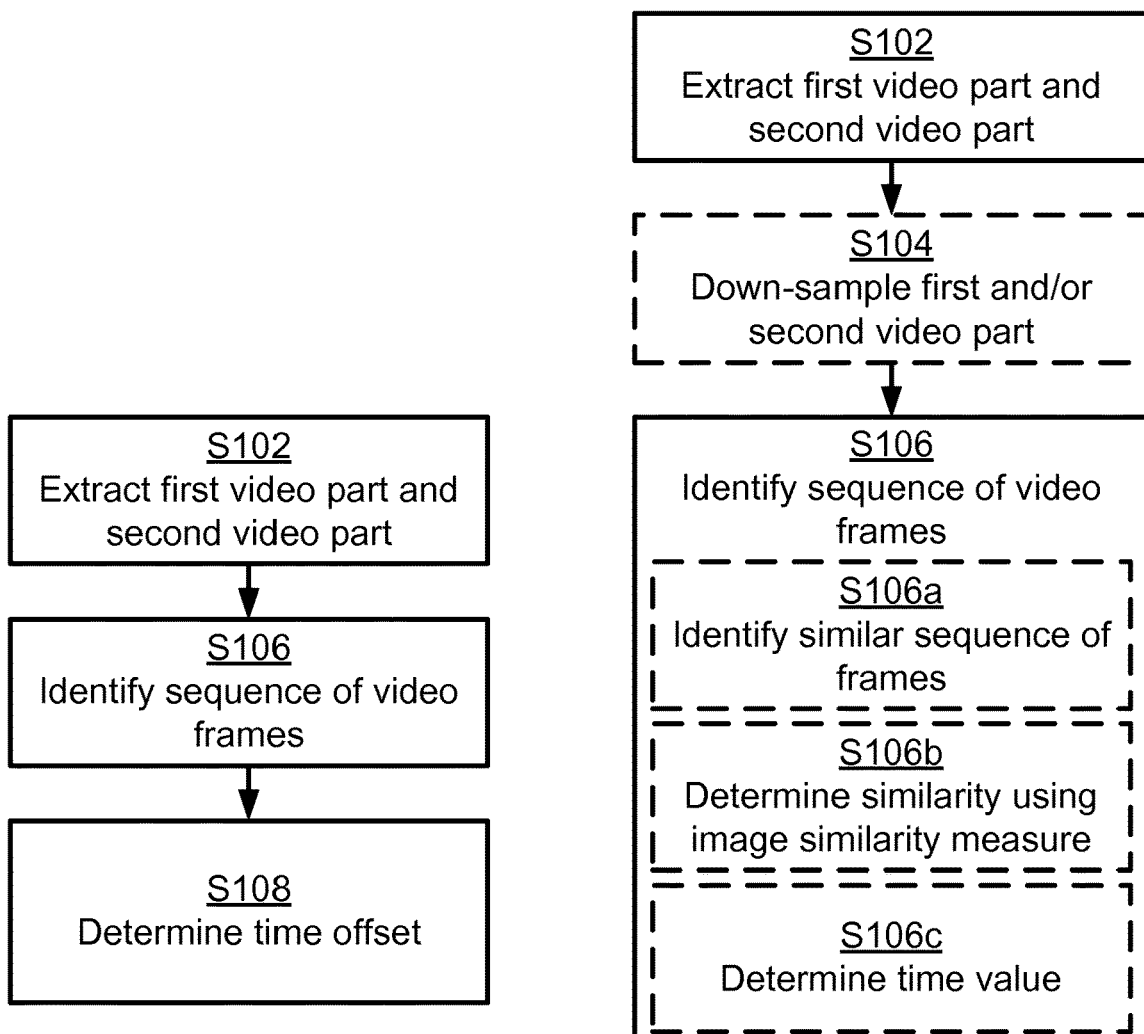
FIGS. 3, 4, 9, 10, and 11 are flowcharts of methods according to embodiments of the invention.
Figure 4:
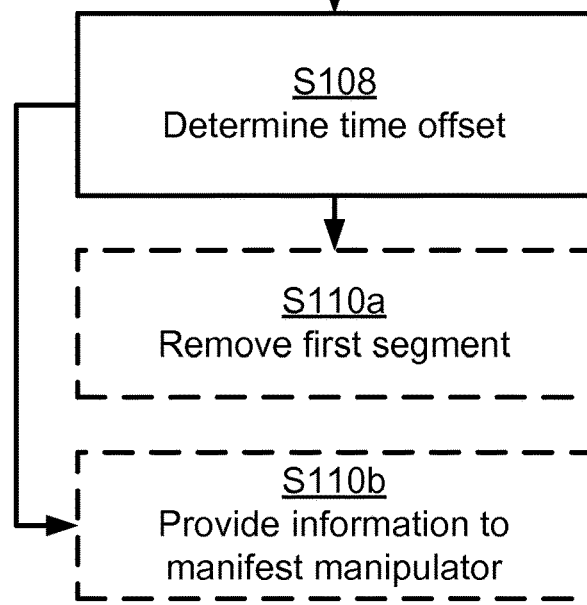

FIGS. 3 and 4 are flowcharts illustrating embodiments of methods for determining a time offset for a video segment 230' of a video stream 200 using metadata 120. The methods are performed by the video network node 1200. The methods are advantageously provided as computer programs 1420.

Reference is now made to FIG. 3 illustrating a method for determining a time offset for a video segment 230' of a video stream 200 using metadata 120 as performed by the video network node 1200 according to an embodiment. Parallel reference is made to FIG. 2

Figure 2:
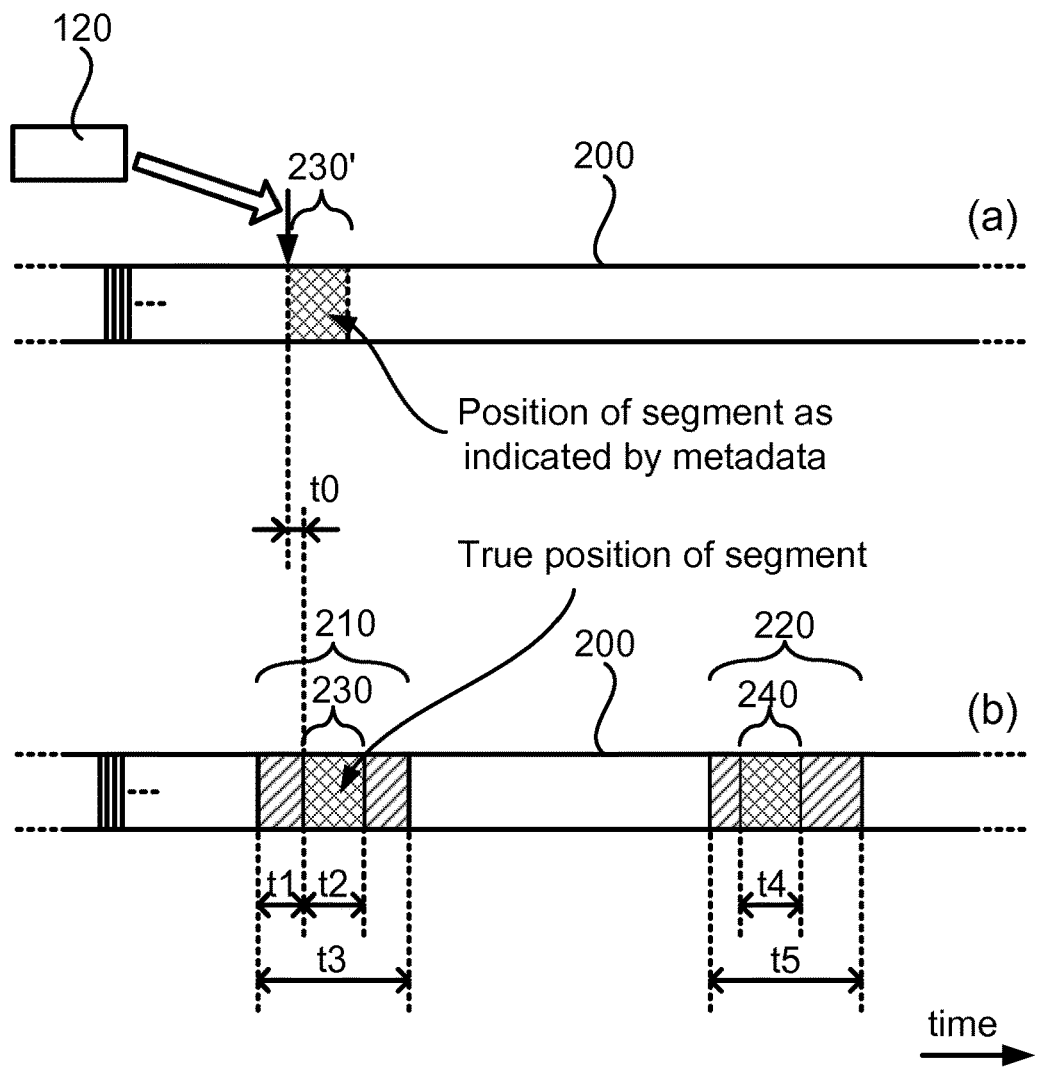
FIG. 2 schematically illustrates video streams according to an embodiment.

The video network node 1200 obtains as input metadata 120 and an approximate start and/or end time of a video segment 230'. FIG. 2 at (a) and (b) schematically illustrates a video stream 200. FIG. 2 at (a) shows that metadata 120 points out a starting point of video segment 230'. That is, the metadata 120 comprises time information of at least one of a start time and an end time of the video segment 230'. FIG. 2 at (b) illustrates the true location of the video segment 230. This location differs by a time offset t0 from the location of the video segment 230' as given by the metadata 120 in FIG. 2 at (a). The video network node 1200 is configured to download parts of the video stream 200 in order to find the exact start time and/or end time of the video segment 230' using the downloaded parts together with the metadata 120.

S102: The video network node 1200 extracts a first video part 210 and a second video part 220 from the video stream 200, each of which comprising a common video segment 230, 240. That is, the first video part 210 and the second video part 220 are extracted such that they both comprise a common video segment 230, 240 representing content occurring in both the first video part 210 and the second video part 220.

In the illustrative example of FIG. 2 the first video part 210 has a duration t3 and the second video part 220 has a duration t5, and the common video segment 230, 240 has a duration t2 in the first video part 210 and a duration t4 in the second video part 220. Further, the common video segment 230, 240 starts a time offset $\Delta t=t1$ from the start of the first video part 210.

S106: The video network node 1200 identifies a sequence of video frames in the first video part 210 that represents the common video segment 230, 240. That is, the identified sequence of video frames occurs somewhere in the first video part 210 and is thus a sub-part of the first video part 210.

S108: The video network node 1200 determines the time offset t0 based on a time difference between an end-point frame of the identified sequence of video frames and the time information in the metadata.

Here, the end-point frame could be either the first frame of the identified sequence of video frames or the last frame of the identified sequence of video frames. That is, in an embodiment the end-point frame of the sequence of video frames is a first occurring frame of the sequence of video frames, and the end-point frame constitutes the beginning of the video segment. In an alternative embodiment the end-point frame of the sequence of video frames is a last occurring frame of the sequence of video frames, and the end-point frame constitutes the ending of the video segment.

The common video segment 230, 240 could be identical to the video segment 230'. Hence, in such embodiments the first video part 210 and the second video part 220 both comprise the content of the video segment (i.e., the content of the video segment 230' is identical to the content of the video segments 230 and 240). The end-point frame of the identified sequence is thus identical to an end-point frame of the video segment 230'. This is the case in the illustrative example of FIG. 2.

However, it could be that neither the first video part 210 nor the second video part 220 comprises the video segment 230'. In such scenarios it can be assumed that there is a known time difference between the sequence of video frames in the first video part 210 and the video segment 230' such that the video network node 1200 can identify an end-point frame of the video segment 230' by adding (or subtracting) this know time difference to/from the end-point frame of the identified sequence in order to determine the time offset t0.

Embodiments relating to further details of determining the time offset t0 for the video segment 230' of the video stream 200 using the metadata 120 as performed by the video network node 1200 will now be disclosed.

Reference is now made to FIG. 4 illustrating methods for determining the time offset to for the video segment 230' of the video stream 200 using the metadata 120 as performed by the video network node 1200 according to further embodiments. It is assumed that steps S102, S106, S108 are performed as described above with reference to FIG. 3 and a thus repeated description thereof is therefore omitted.

There may be different ways to extract the first video part 210 and the second video part 220 from the video stream 200. As disclosed above, the first video part 210 and the second video part 220 are extracted such that they both comprise a common video segment 230, 240. Further, according to the metadata 120 the start time and stop time of the video segment 230' is known. Hence, in scenarios where the common video segment 230, 240 is identical to the video segment 230' first video part 210 and the second video part 220 could be selected to at least comprise content corresponding to the video segment 230'. The first video part 210 and the second video part 220 could thus be extracted by downloading the video stream 200 from approximate start time−Δt and until approximate end time+Δt. The value of Δt is taken to be large enough to contain the maximum approximation error of the metadata. In view of the above, the value of Δt could correspond to a single video frame (corresponding to a duration in time of a fraction of a second) up to several video frames (corresponding to a duration in time of more than a second).

There may be different ways to perform the identifying in step S106. Embodiments relating thereto will now be described in turn.

As disclosed above, the metadata 120 comprises time information of at least one of a start time and an end time of the video segment 230'. In one embodiment the metadata 120 comprises information of a time duration of the video segment 230'.

The sequence of video frames could then in above step S106 be identified such that it has a time duration equal to the time duration of the video segment.

The sequence of video frames could in step S106 be identified using a similarity measure. Particularly, according to an embodiment the video network node 1200 is configured to perform step S106a as part of step S106 in order to identify the sequence of video frames:

S106a: The video network node 1200 identifies, in the first video part 210, a first sequence of video frames that is similar to a second sequence of video frames in the second video part 220. A condition for this first sequence of video frames is that it has a time duration equal to the time duration of the video segment (as given by the metadata 120).

As disclosed above, the common video segment 230, 240 could be identical to the video segment 230'. Hence, since the common video segment 230, 240 is part of the first video part 210 the first sequence of video frames as identified in step S106a could be identical to the video segment 230'.

However, as also disclosed above, it could be that neither the first video part 210 nor the second video part 220 comprise the video segment 230'. In such scenarios the first sequence of video frames as identified in step S106a could be adjacent the video segment 230' or even further separated from the video segment 230', again assuming that there is a known time difference between the sequence of video frames in the first video part 210 and the video segment 230'.

There could be different ways to identify first sequence of video frames in step S106a. According to an embodiment an image similarity measure is determined for all combinations (or a subset thereof) of video frames between the first video part 210 and the second video part 220. Hence, according to an embodiment the video network node 1200 is configured to perform step S106a as part of step S106 in order to identify the sequence of video frames:

S106b: The video network node 1200 determines that the first sequence of video frames (as identified in step s106a) in the first video part 210 is similar to the second sequence of video frames in the second video part 220 using an image similarity measure between video frames in the first video part 210 and video frames in the second video part 220.

There could be different examples of image similarity measures that could be applied in the determination in step S106b. Either the image similarity measure is determined using the video frames of the first video part 210 and the second video part 220 as is, or the image similarity measure is determined using processed video frames of the first video part 210 and the second video part 220. One way to process the video frames is to subject the video frames to similarity hashing. According to an embodiment the image similarity measure is thus determined using similarity hashes of video frames in the first video part 210 and similarity hashes of video frames in the second video part 220. There are different ways to determine the similarity hashes (that is, to perform similarity hashing on the video frames). One type of similarity hashing is perceptual hashing, in which perceptually similar images obtain similar hash values with small distance between them. In general terms, perceptual hashing is the use of an algorithm that produces a snippet, or fingerprint, of various forms of multimedia. Perceptual hash functions are analogous if features are similar, whereas cryptographic hashing relies on the avalanche effect of a small change in input value creating a drastic change in output value. Further aspects of the similarity hashing will be described below with reference to FIG. 5.

Figure 5:
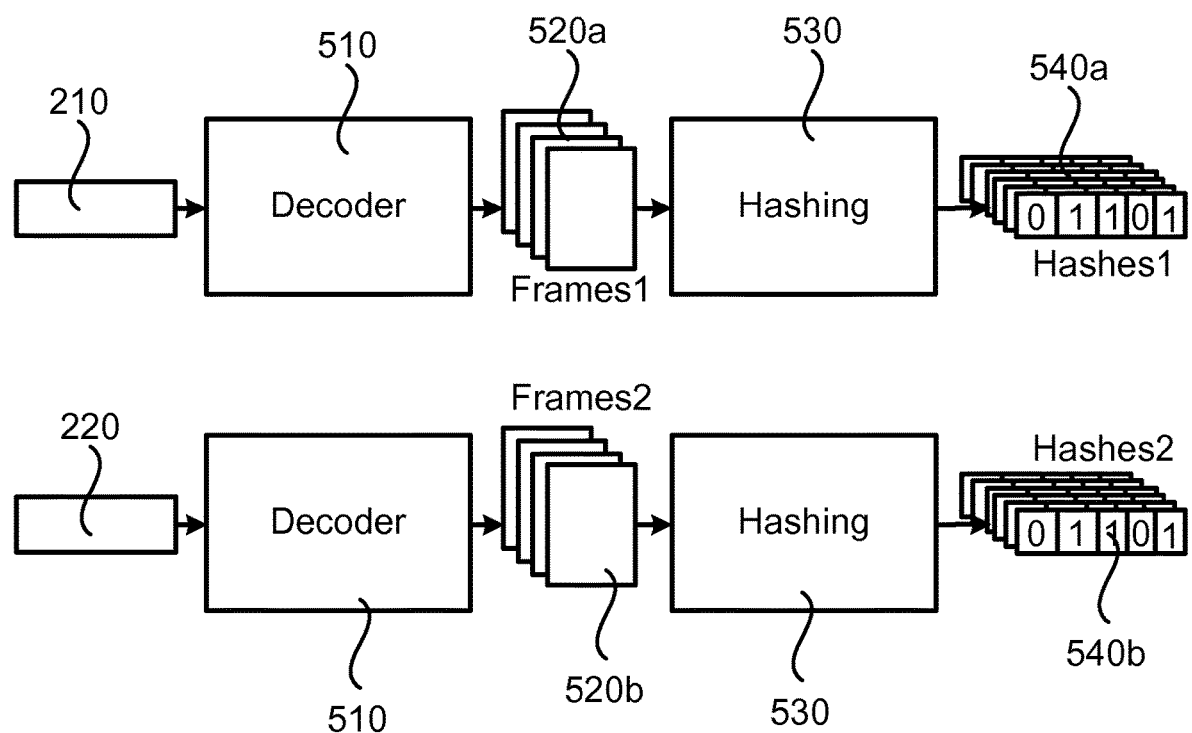
FIG. 5 is a schematic illustration of similarity hashing according to an embodiment.

FIG. 5 is a schematic illustration of similarity hashing according to an embodiment. Input as defined by the first video part 210 and the second video part 220 are decoded by a decoder 510 (possibly using down-sampling as in step S104 to reduce the frame rate) to produce respective sequences of frames 520a, 520b (denoted Frames1 and Frames2 in FIG. 5). The video frames 520a, 520b are then subjected to similarity hashing 530, producing respective image hashes 540a, 540b (denoted Hashes1 and Hashes2 in FIG. 5). Each frame is thus represented by its own image hash.

Every image hash of a frame of the first video part 210 could be compared with every image hash of a frame of the second video part 220. Alternatively, only a selected subset of the image hashes of the first video part 210 are compared to the same selected subset of image hashes of the second video part 220. The higher the similarity measure, the more similar two frames are. Denote by S(i,j) the image similarity score between the i:th frame of the first video part 210 and the j:th frame of the second video part 220. S(i,j) is determined by comparing the image hash of frame i with the image hash of frame j using an appropriate distance measure (e.g. dot-product).

Figure 6:
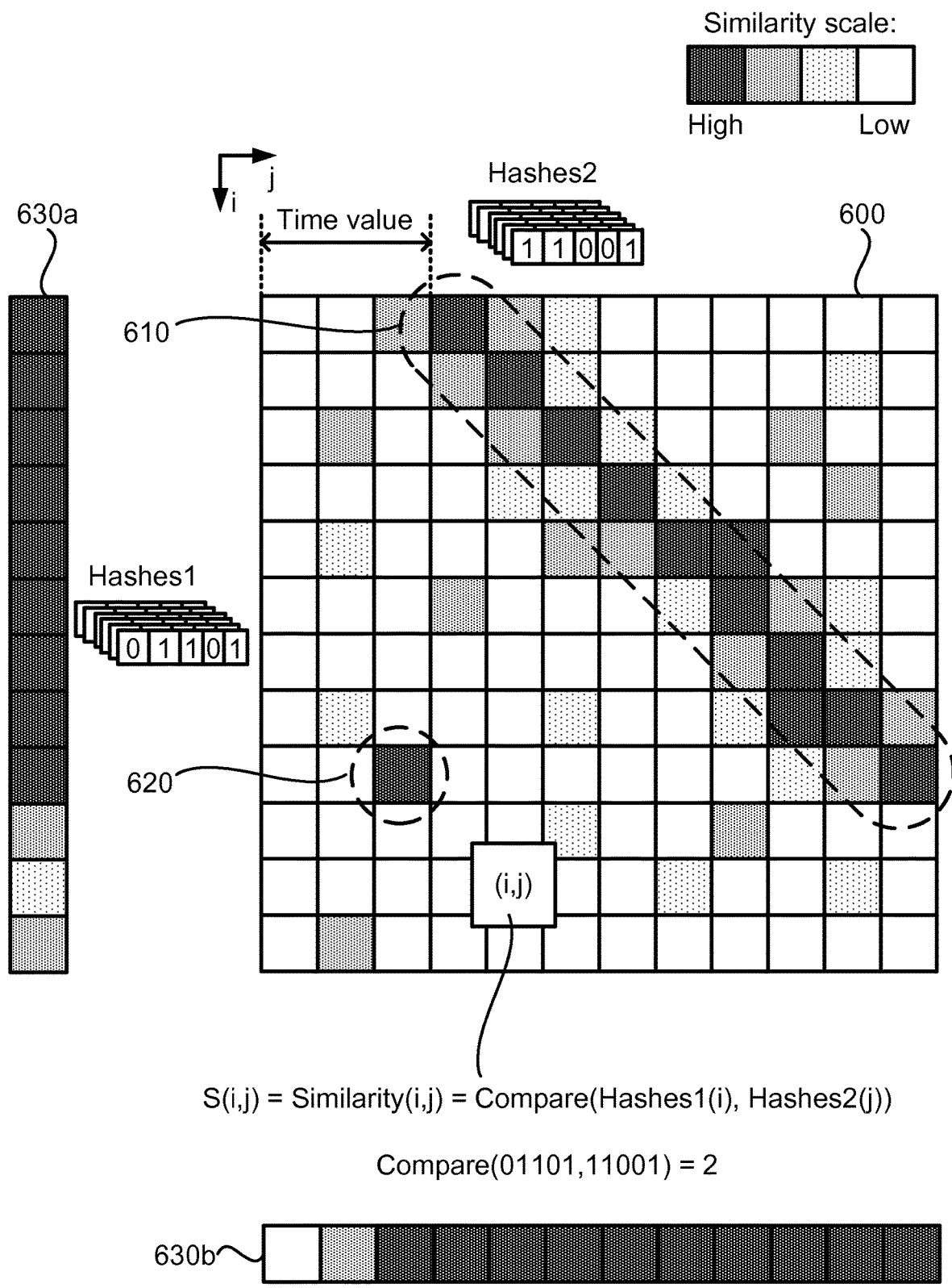
FIG. 6 is a schematic illustration of a similarity matrix according to an embodiment.

FIG. 6 is a schematic illustration of a similarity matrix 600 according to an embodiment. FIG. 6 shows the similarity matrix 600 which holds at position (i,j) the similarity score S(i,j). In the illustrative example of FIG. 6, darker entries in the similarity matrix 600 represent higher similarity score and lighter entries in the similarity matrix 600 represent lower similarity score. The maximum entry per row in the similarity matrix 600 can be stored in a first vector 630a for the first video part 210 and the maximum entry per column in the similarity matrix 600 can be stored in a second vector 630b for the second video part 220. The similarity matrix 600 can be interpreted as a heat-map. A search can be made for the diagonal 610 in the similarity matrix 600 with the maximum similarity score. The position of this diagonal 610 yields the time value of step S106c (by multiplying the number frames skipped from the main diagonal of the similarity matrix 600 in order to reach the diagonal 610 with the frame rate of the first video part 210). Further aspects of searching for the diagonal 610 in the similarity matrix 600 will be disclosed below with reference to FIG. 11.

The image similarity measure is maximized when the first sequence of video frames and the second sequence of video frames match each other. Hence, according to an embodiment the video network node 1200 is configured to perform step S106c as part of step S106:

S106c: The video network node 1200 determines, in relation to a first occurring frame of the first video part 210, a time value that maximizes the image similarity measure. The time offset t0 is then determined based on the time value.

If the common video segment 230, 240 is identical to the video segment 230', then the time offset t0 is identical to the time value determined in step S106c. Otherwise, the known time difference between the sequence of video frames in the first video part 210 and the video segment 230' needs to be added to the time value determined in step S106c to yield the time offset t0.

The image similarity measure could in step S106b be determined to comprise a sequence of image similarity values. It could be that the sequence of image similarity values comprises isolated high image similarity values. Such isolated high image similarity values could be removed from the image similarity measure when determining the time value in step S106c. That is, isolated high values 620 in the similarity matrix 600 could be removed before searching for the diagonal 610 in order to reduce the possibility of false positives. Thus, elements representing isolated high image similarity values could be removed from the matrix when determining the time value. This enables isolated high image similarity values to be removed from the image similarity measure.

The similarity matrix 600 does not necessarily need to be a square matrix; it will be a rectangular (non-square) matrix in case the first video part 210 and the second video part 220 do not result in the same number of image hashes (for example by the first video part 210 and the second video part 220 not containing the same number of frames).

In order to reduce the execution time of at least above steps S106 and S108 the first video part 210 and/or the second video part 220 could be down-sampled before steps S106 and S108 are performed. Hence, according to an embodiment, the video network node 1200 is configured to perform step S104 before steps S106 and S108:

S104: The video network node 1200 down-samples at least one of the first video part 210 and the second video part 220 before identifying the sequence of video frames in step S106.

Down-sampling generally refers to reducing the frame rate of the first video part 210 and/or the second video part 220, such as using only every k:th frame, where k>1 is an integer, or any other subset of frames. However, this does not exclude that, additionally or alternatively, the resolution of the individual frames could be reduced.

An approximation of the time offset t0 could then be found using the thus down-sampled at least one of the first video part 210 and the second video part 220. Hence, steps S104, S106, and S108 could be iteratively performed at least two times. That is, step S106 of identifying the sequence of video frames could be repeated for a new first video part and a new second video part. The new first video part and the new second video part are determined based on the sequence of video frames identified using the down-sampled at least one of the first video part and the second video part. For example, the new first video part and the new second video part could selected based on the time value determined in step s106c that maximizes the image similarity measure. That is, a first approximation of the time offset t0 could be found using a down-sampled first video part 210 and a down-sampled second video part 220 in an initial search window, and a second, refined, approximation of the time offset t0 could be found using a down-sampled first video part 210 and a down-sampled second video part 220 in a refined search window, where the refined search window is selected based on the time value determined in step s106c that maximizes the image similarity measure in the initial search window.

There could be different actions for the video network node 1200 to perform upon having determined the time offset t0 in step S108.

According to some aspects the video network node 1200 removes at least part of the video segment 230', for example to replace it with a new video segment. Hence, according to an embodiment, the video network node 1200 is configured to perform step S110a:

S110a: The video network node 1200 removes at least part of the video segment 230' from the video stream 200 using the end-point frame of the identified sequence of video frames as reference.

It could be that the video network node 1200 removes the entire video segment 230', or even that the video network node 1200 removes more than just the video segment 230', such as the video segment 230' and an adjacent video segment or the video segment 230' and another video segment separated from the video segment 230' by a known time difference. This could be in a case where the video segment 230' is a first video segment of a composite video segment, and, for example, where the first video part 210 comprises the composite video segment. The video network node 1200 could, for example, be configured to analyze the manifest 170 for the video stream 200 that the client node 140 requests, and to remove only the video segment corresponding to an advertisement break, thus allowing the replacement of the one or more of the advertisements of the advertisement break with a video segment corresponding to one or more new advertisements in a precise, frame-accurate manner, even when the metadata 120 is inaccurate.

According to some aspects the video network node 1200 does not perform any manipulation of the video stream 200, such as removal or replacement of the video segment 230', but instead informs the manifest manipulator node 130 of the determined time offset t0 (for the manifest manipulator node 130 to perform such manipulation). Hence, according to an embodiment, the video network node 1200 is configured to perform step S110b:

S110b: The video network node 1200 provides information of the time offset t0 to a manifest manipulator node 130.

Further aspects of determining the time offset t0 for the video segment 230' of the video stream 200 using the metadata 120 as performed by the video network node 1200 and applicable to any of the above embodiments will now be described.

Figure 7:
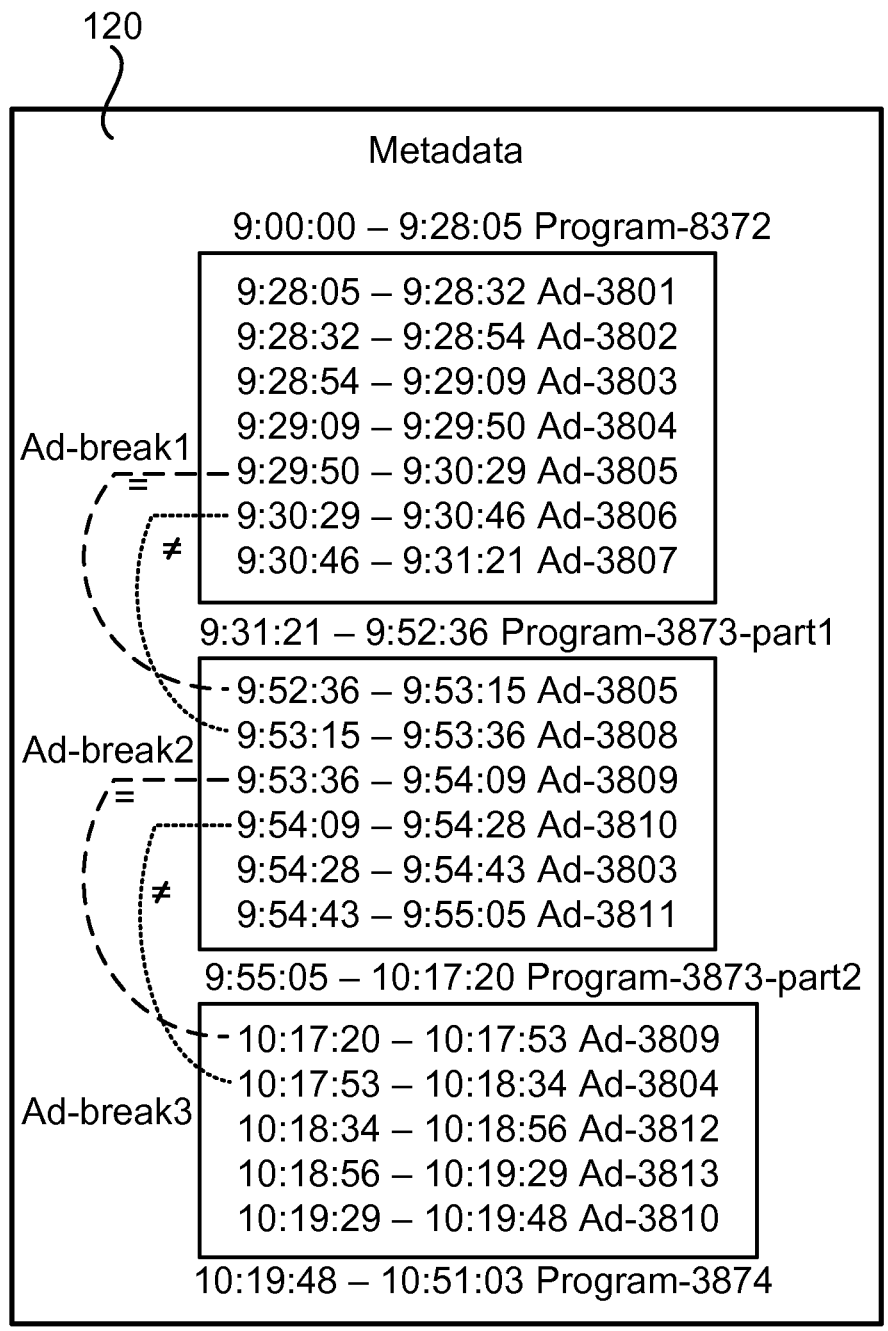
FIG. 7 is a schematic illustration of metadata according to an embodiment.

FIG. 7 gives an illustrative example of metadata 120. In the illustrative example metadata in FIG. 7 there are 3 advertisement breaks, denoted Ad-break1, Ad-break2, and Ad-break3. Ad-break1 starts with advertisement Ad-3801 and ends with advertisement Ad-3807; ad-break2 starts with advertisement Ad-3805 and ends with advertisement Ad-3811; ad-break3 starts with advertisement Ad-3809 and ends with advertisement ad-3810. As can be seen in FIG. 7, Ad-break2 comprises a segment denoted Ad-3805 that occurs also in Ad-break1. Ad-3805 in Ad-break2 is adjacent Ad-3808 which does not occur in Ad-break1. By using embodiments disclosed herein pairs of ad-breaks could be found such that the first advertisement of the first ad-break appears somewhere within the second ad-break. For example, Ad-3805 is the first advertisement in ad-break2 and it appears somewhere within ad-break1 (as its fifth advertisement), so the pair (ad-break2, ad-break1) has this property that the first advertisement of the first ad-break in the pair appears somewhere within the second ad-break of the pair. Also, Ad-3809 appears as the first advertisement in ad-break3 and somewhere within ad-break2 (it is the third advertisement in ad-break2) so (ad-break3, ad-break2) is also a pair of advertisement breaks which has this property that the first advertisement of the first ad-break in the pair appears somewhere within the second ad-break of the pair. Hence, the exact start time and/or end time for Ad-3805 in Ad-break2 (or Ad-break1) could be found using embodiments disclosed herein, and similar for Ad-3810. This is illustrated in FIG. 8.

Figure 8:
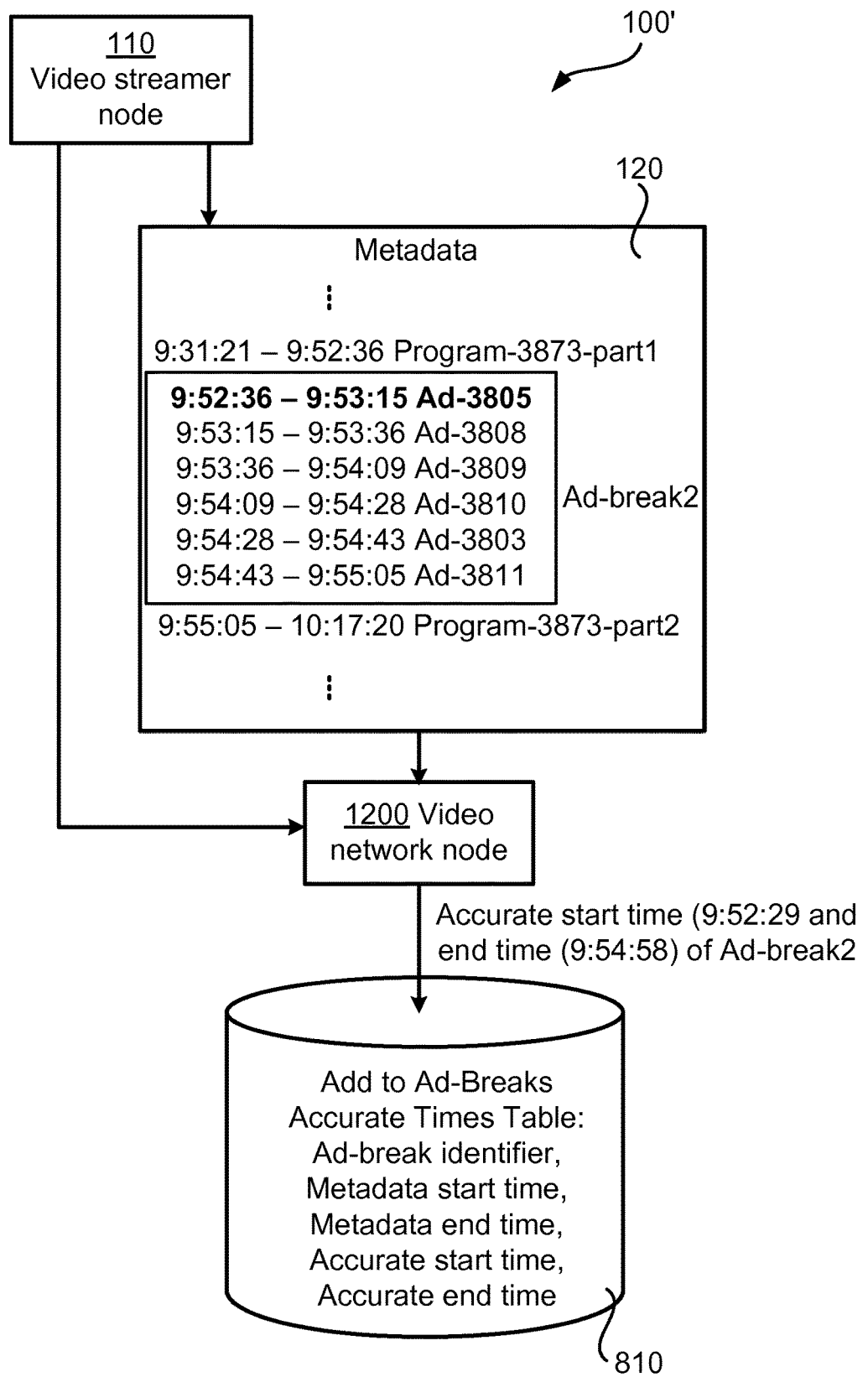
FIG. 8 is a schematic diagram illustrating part of the communications system of FIG. 1.

FIG. 8 is a schematic diagram illustrating a part 100' of the communications system in FIG. 1. FIG. 8 schematically illustrates a video network node 1200 taking as input the metadata 120 (only part of the metadata of FIG. 7 is shown) and the video stream 200 from the video streamer node 110 as input and produces as output to a database 810 an accurate start time and end time of Ad-break2. In the database data representing the identifier of Ad-break2, the start time of Ad-break2 as given by the metadata, the end time of Ad-break2 as given by the metadata, the determined accurate start time of Ad-break2 as determined by the video network node 1200, and the determined accurate end time of Ad-break2 as determined by the video network node 1200 is stored.

Figure 9:
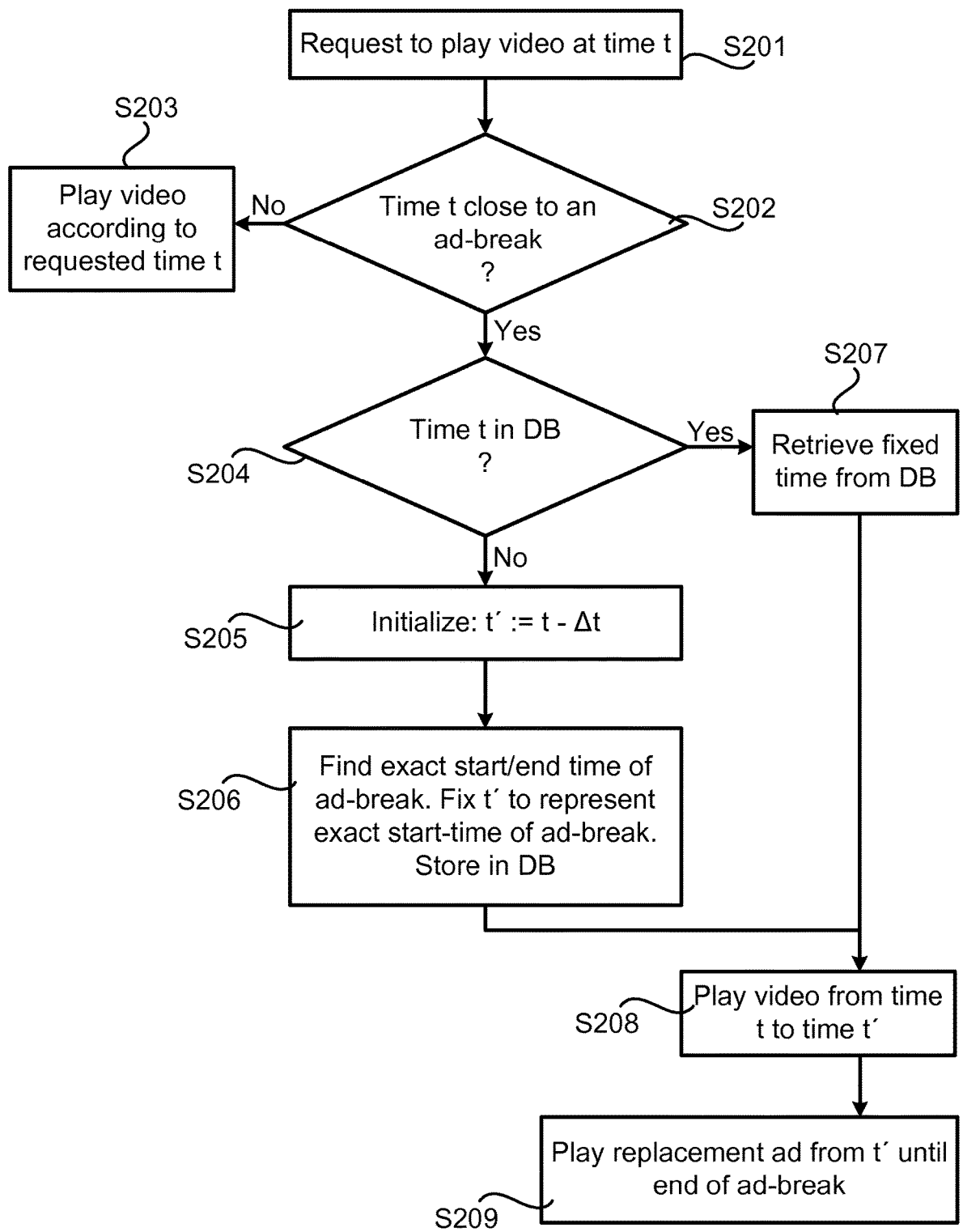

FIG. 9 is a flowchart of a particular embodiment for determining the time offset t0 for the video segment 230' of the video stream 200 using the metadata 120 as performed by the video network node 1200 based on at least some of the above disclosed embodiments.

S201: The video network node 1200 receives a request from a client node 140 to playout the video stream 200 starting at time t.

S202: The video network node 1200 checks if the time t is close to an advertisement break. If no, step S203 is entered, and if yes, step S204 is entered.

S203: The video network node 1200 enables playout of the requested video stream 200 starting at time t at the client node 140.

S204: The video network node 1200 checks if t is already stored in a database of fixed times (Already-Fixed-Times-DB). If no, step S205 is entered, and if yes, step S207 is entered.

S205: The video network node 1200 determines an initial start time t' from the time t and Δt (see above for a definition of Δt).

S206: The video network node 1200 determines the exact start and end time of the advertisement break. The variable t' is fixed to represent the exact start time of the advertisement break and stored in Already-Fixed-Times-DB together with t.

S207: The video network node 1200 retrieves the exact start time t' from the Already-Fixed-Times-DB using t.

S208: The video network node 1200 enables playout of the requested video stream 200 from time t to time t' at the client node 140.

S209: The video network node 1200 replaces the original advertisement with a new advertisement to be played out at the client node 140 starting at time t'.

Figure 10:
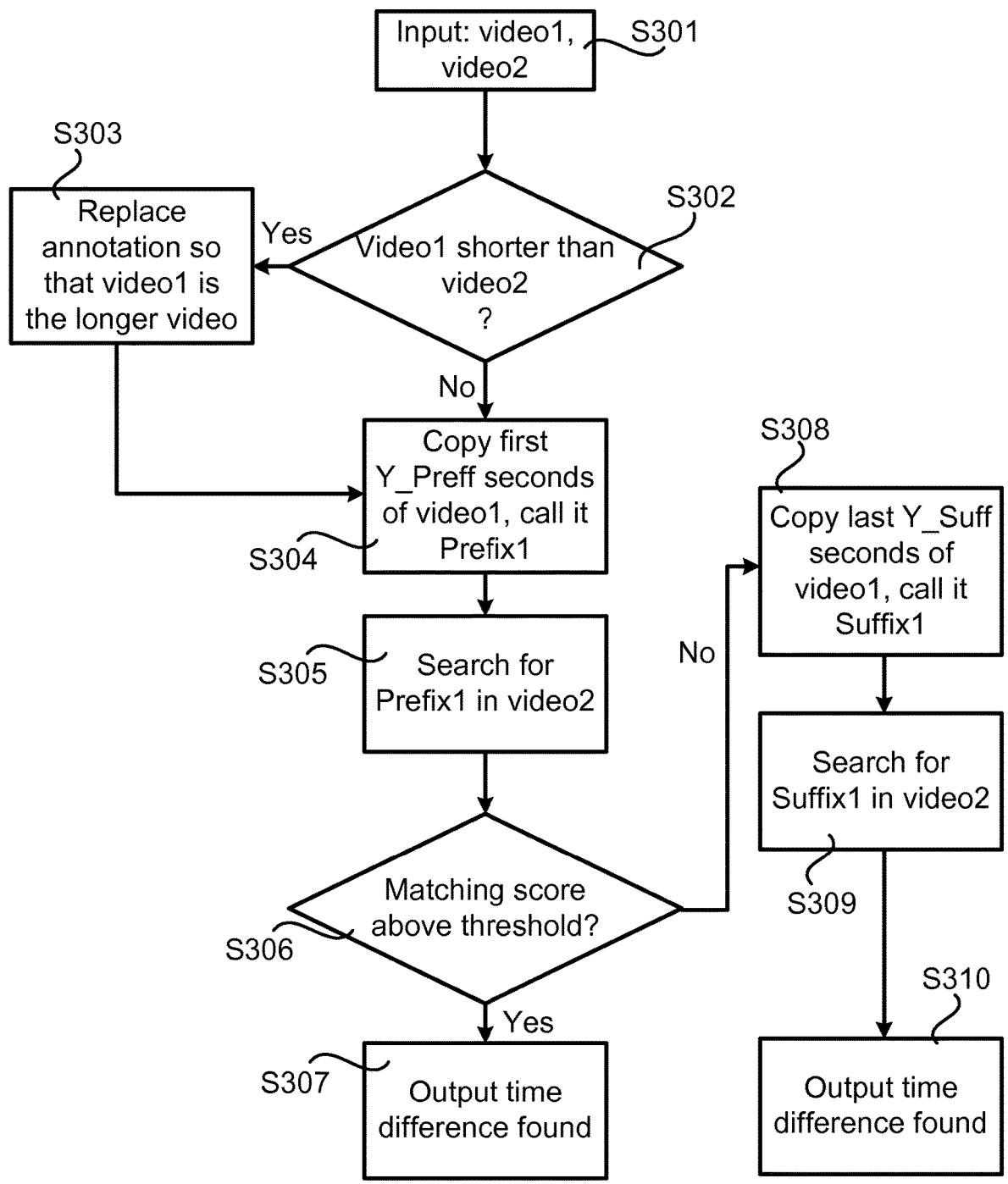

FIG. 10 is a flowchart of a particular embodiment for determining the time difference based on at least some of the above disclosed embodiments.

S301: The video network node 1200 extracts a first video part (denoted video1) and a second video part (denoted video2) from the video stream, each of which comprising a common video segment 230, 240.

S302: The video network node 1200 checks if the first video part is shorter than the second video part. If yes, step S303 is entered, and else step S304 is entered.

S303: The video network node 1200 replaces the annotation of the first video part and the second video part with each other such that the first video part is longer than the second video part.

S304: The video network node 1200 identifies the first seconds, Y_Preff, of the first video part and denotes this part of the first video part as Prefix1.

S305: The video network node 1200 searches for Prefix1 in the second video part using an image similarity measure, e.g., as described with reference to FIG. 6.

S306: The video network node 1200 checks if a matching part in the second video part is found. If yes, step S307 is entered, and if no, step S308 is entered.

S307: The video network node 1200 outputs the time value that maximizes the image similarity measure in step S305.

S308: The video network node 1200 identifies the last seconds, Y_Suff, of the first video part and denotes this part of the first video part as Suffix1.

S309: The video network node 1200 searches for Suffix1 in the second video part using an image similarity measure, e.g., as described with reference to FIG. 6.

S310: The video network node 1200 outputs the time value that maximizes the image similarity measure in step S309.

Figure 11:
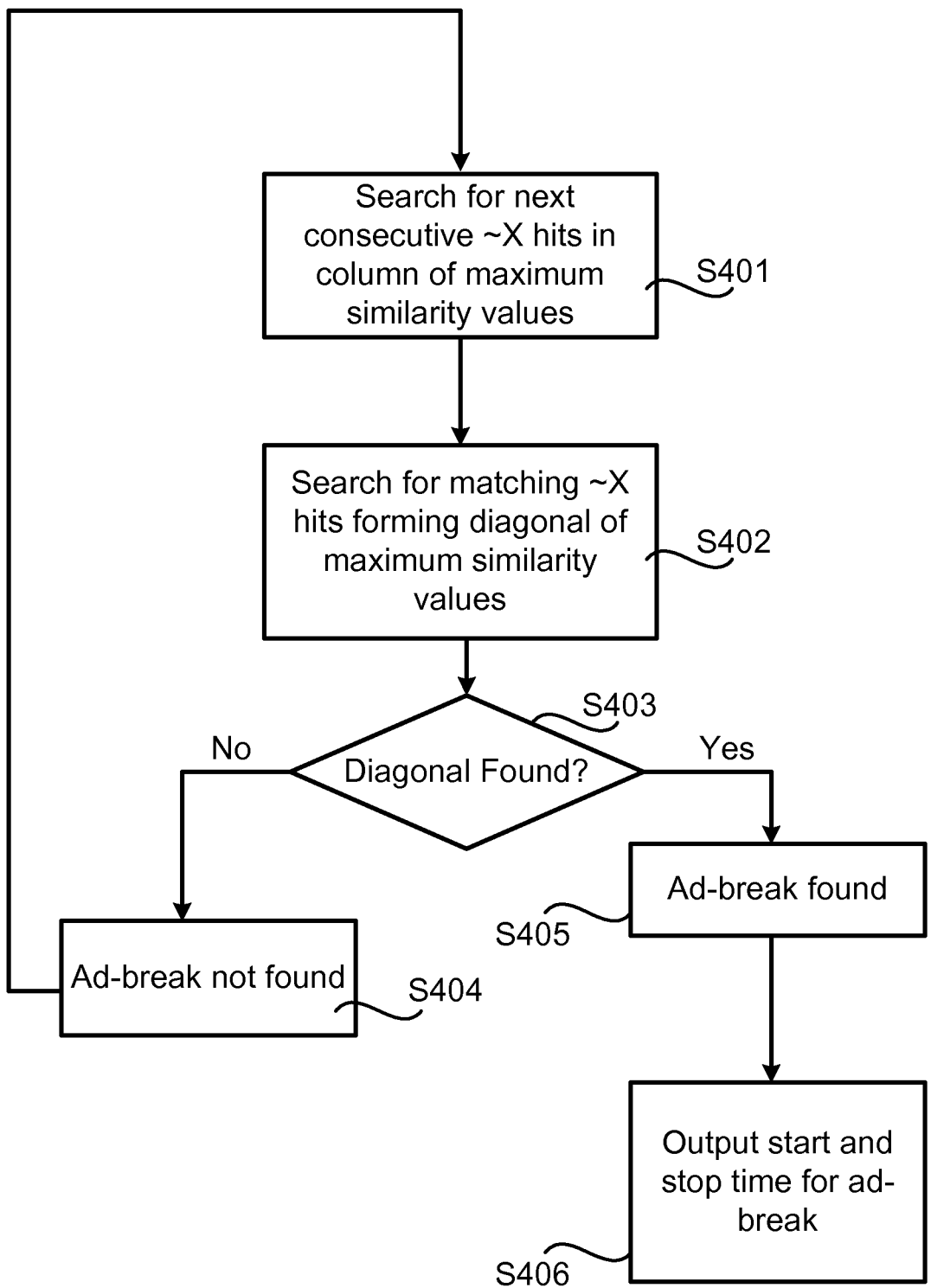

FIG. 11 is a flowchart of an embodiment for searching for the diagonal 610 in the similarity matrix 600.

Let X represent the expected number of frames of the video segment 230'. Further, assume that the video segment 230' has a time duration d as given by the metadata 120. Further, let r represent the frame rate. That is, the first video part 210 and the second video part 220 are sampled to have a frame rate r. Then X=r·d. The video segment 230' is expected to represent a common video segment 230, 240 with a length of X frames in both the first video part 210 and the second video part 220.

S401: The video network node 1200 searches the first vector 630 for the next sequence consecutive entries of (approximately) length X of high similarities (i.e., a sequence of length X whose total similarity score is above a threshold).

S402: The video network node 1200 searches for a diagonal 610 starting at the row indicated by the first entry in the sequence found in step S401.

S403: The video network node 1200 checks if a diagonal 610 is found. If no, step S404 is entered, and if yes, step S405 is entered.

S404: The video network node 1200 determines that the video segment 230' was not found, and hence that no advertisement break was found. Step S401 is entered once again.

S405: The video network node 1200 determines that the video segment 230' was found, and hence that an advertisement break was found.

S406: The video network node 1200 outputs the start and stop times of the video segment 230'.

Although some of the examples presented herein relate to advertisements have been mentioned as an example where a video segment (as defined by a single advertisement or an entire advertisement break) is to be replaced or removed from a video stream, the herein disclosed embodiments are not limited to handling of advertisements; rather the herein disclosed embodiments are applicable to any examples where a particular video segment is to be accurately identified in a video stream.

Figure 12:
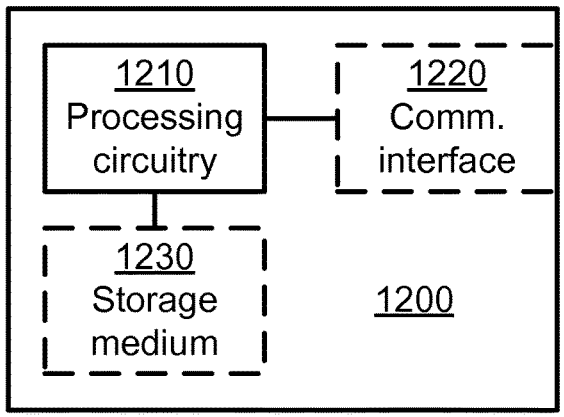
FIG. 12 is a schematic diagram showing functional units of a video network node according to an embodiment.

FIG. 12 schematically illustrates, in terms of a number of functional units, the components of a video network node 1200 according to an embodiment. Processing circuitry 1210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 1230. The processing circuitry 1210 may further be provided as at least one application specific integrated circuit (ASIC), or field programmable gate array (FPGA).

Particularly, the processing circuitry 1210 is configured to cause the video network node 1200 to perform a set of operations, or steps, S102-S110b, S201-S209, S301-S310, S401-S406, as disclosed above. For example, the storage medium 1230 may store the set of operations, and the processing circuitry 1210 may be configured to retrieve the set of operations from the storage medium 1230 to cause the video network node 1200 to perform the set of operations. The set of operations may be provided as a set of executable instructions.

Thus the processing circuitry 1210 is thereby arranged to execute methods as disclosed herein. The storage medium 1230 may also comprise persistent storage, which, for example, can be any single one or combination of magnetic memory, optical memory, solid state memory or even remotely mounted memory. The video network node 1200 may further comprise a communications interface 1220 at least configured for communications with other entities and devices. As such the communications interface 1220 may comprise one or more transmitters and receivers, comprising analogue and digital components. The processing circuitry 1210 controls the general operation of the video network node 1200 e.g. by sending data and control signals to the communications interface 1220 and the storage medium 1230, by receiving data and reports from the communications interface 1220, and by retrieving data and instructions from the storage medium 1230. Other components, as well as the related functionality, of the video network node 1200 are omitted in order not to obscure the concepts presented herein.

Figure 13:
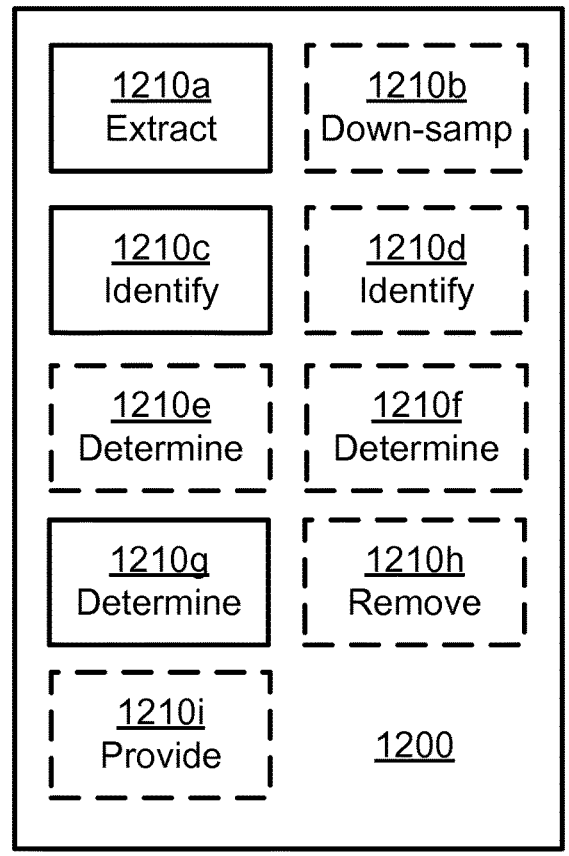
FIG. 13 is a schematic diagram showing functional modules of a video network node according to an embodiment.

FIG. 13 schematically illustrates, in terms of a number of functional modules, the components of a video network node 1200 according to an embodiment. The video network node 1200 of FIG. 13 comprises a number of functional modules; an extract module 1210a configured to perform step S102, an identify module 1210c configured to perform step S106, and a determine module 1210i configured to perform step S108. The video network node 1200 of FIG. 13 may further comprise a number of optional functional modules, such as any of a down-sample module 1210b configured to perform step S104, an identify module 1210d configured to perform step S106a, a determine module 1210e configured to perform step S106b, a determine module 1210f configured to perform step S106c, a remove module 1210h configured to perform step S110a, and a provide module 1210i configured to perform step S110b. In general terms, each functional module 1210a-1210i may in one embodiment be implemented only in hardware and in another embodiment with the help of software, i.e., the latter embodiment having computer program instructions stored on the storage medium 1230 which when run on the processing circuitry 1210 makes the video network node 1200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 1210 a-1210 i may be implemented by the processing circuitry 1210, possibly in cooperation with the communications interface 1220 and/or the storage medium 1230. The processing circuitry 1210 may thus be configured to from the storage medium 1230 fetch instructions as provided by a functional module 1210 a-1210 i and to execute these instructions, thereby performing any steps as disclosed herein.

The video network node 1200 may be provided as a standalone device or as a part of at least one further device. For example, the video network node 1200 may be provided in the manifest manipulator node 130. Alternatively, functionality of the video network node 1200 may be distributed between at least two devices, or nodes. These at least two nodes, or devices, may either be part of the same network part or may be spread between at least two such network parts.

Thus, a first portion of the instructions performed by the video network node 1200 may be executed in a first device, and a second portion of the of the instructions performed by the video network node 1200 may be executed in a second device; the herein disclosed embodiments are not limited to any particular number of devices on which the instructions performed by the video network node 1200 may be executed.

Hence, the methods according to the herein disclosed embodiments are suitable to be performed by a video network node 1200 residing in a cloud computational environment. Therefore, although a single processing circuitry 1210 is illustrated in FIG. 12 the processing circuitry 1210 may be distributed among a plurality of devices, or nodes. The same applies to the functional modules 1210 a-1210 i of FIG. 13 and the computer program 1420 of FIG. 14 (see below).

Figure 14:
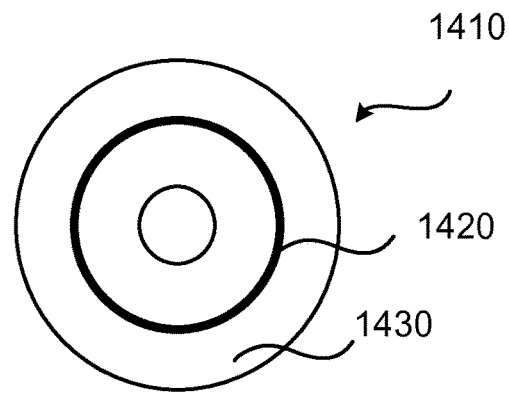
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 1210 and thereto operatively coupled entities and devices, such as the communications interface 1220 and the storage medium 1230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus)

memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept of the invention has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a time offset for a video segment of a video stream using metadata, the metadata comprising time information of at least one of a start time and an end time of the video segment, the method being performed by a video network node, the method comprising:
   extracting a first video part and a second video part from the video stream, each of which comprising a common video segment;
   identifying a sequence of video frames in the first video part that represents the common video segment; and
   determining the time offset based on a time difference between an end-point frame of the identified sequence of video frames and the time information in the metadata.

2. The method according to claim 1, wherein the metadata comprises information of time duration of the video segment, and wherein the sequence of video frames is identified such that it has a time duration equal to the time duration of the video segment.

3. The method according to claim 1, wherein identifying the sequence of video frames comprises:
   identifying, in the first video part, a first sequence of video frames that is similar to a second sequence of video frames in the second video part, and wherein the first sequence of video frames has a time duration equal to the time duration of the video segment.

4. The method according to claim 3, wherein the first sequence of video frames is identical to the video segment.

5. The method according to claim 3, wherein the first sequence of video frames is adjacent the video segment.

6. The method according to claim 3, wherein identifying the sequence of video frames comprises:
   determining that the first sequence of video frames is similar to the second sequence of video frames in the second video part using an image similarity measure between video frames in the first video part and video frames in the second video part.

7. The method according to claim 6, wherein the image similarity measure is determined using similarity hashes of video frames in the first video part and similarity hashes of video frames in the second video part.

8. The method according to claim 6, further comprising:
   determining, in relation to a first occurring frame of the first video part, a time value that maximizes the image similarity measure, and wherein the time offset is determined based on the time value.

9. The method according to claim 8, wherein the image similarity measure comprises a sequence of image similarity values, and wherein isolated high image similarity values are removed from the image similarity measure when determining the time value.

10. The method according to claim 1, further comprising:
    down-sampling at least one of the first video part and the second video part before said identifying the sequence of video frames.

11. The method according to claim 10, wherein the step of identifying the sequence of video frames is repeated for a new first video part and a new second video part, wherein the new first video part and the new second video part are determined based on the sequence of video frames identified using the down-sampled at least one of the first video part and the second video part.

12. The method according to claim 1, wherein the end-point frame of the sequence of video frames is a first occurring frame of the sequence of video frames, and wherein the end-point frame constitutes beginning of the video segment.

13. The method according to claim 1, wherein the end-point frame of the sequence of video frames is a last occurring frame of the sequence of video frames, and wherein the end-point frame constitutes ending of the video segment.

14. The method according to claim 1, further comprising:
    removing at least part of the video segment from the video stream using the end-point frame of the identified sequence of video frames as reference.

15. The method according to claim 1, further comprising:
    providing information of the time offset to a manifest manipulator node.

16. The method according to claim 1, wherein the video segment is a first video segment of a composite video segment, and wherein the first video part comprises the composite video segment.

17. A video network node for determining a time offset for a video segment of a video stream using metadata, the metadata comprising time information of at least one of a start time and an end time of the video segment, the video network node comprising processing circuitry, the processing circuitry being configured to cause the video network node to:
    extract a first video part and a second video part from the video stream, each of which comprising a common video segment;
    identify a sequence of video frames in the first video part that represents the common video segment; and
    determine the time offset based on a time difference between an end-point frame of the identified sequence of video frames and the time information in the metadata.

18. A video network node for determining a time offset for a video segment of a video stream using metadata, the metadata comprising time information of at least one of a start time and an end time of the video segment the video network node comprising:
    processing circuitry; and
    a storage medium storing instructions that, when executed by the processing circuitry, cause the video network node to:
        extract a first video part and a second video part from the video stream, each of which comprising a common video segment;
        identify a sequence of video frames in the first video part that represents the common video segment; and
        determine the time offset based on a time difference between an end-point frame of the identified sequence of video frames and the time information in the metadata.

* * * * *